US010144274B1

(12) United States Patent
Sviberg

(10) Patent No.: US 10,144,274 B1
(45) Date of Patent: Dec. 4, 2018

(54) ROOF ATTACHMENT AND PASSENGER CAR COMPRISING A REMOVABLE ROOF ATTACHMENT

(71) Applicant: Webasto SE, Stockdorf (DE)

(72) Inventor: Magnus Sviberg, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 15/611,941

(22) Filed: Jun. 2, 2017

(51) Int. Cl.
*B60J 1/18* (2006.01)
*B60J 7/10* (2006.01)
*B60J 7/00* (2006.01)

(52) U.S. Cl.
CPC ............ *B60J 1/1815* (2013.01); *B60J 1/1823* (2013.01); *B60J 7/10* (2013.01); *B60J 7/106* (2013.01); *B60J 1/18* (2013.01); *B60J 7/00* (2013.01)

(58) Field of Classification Search
CPC . B60J 1/1815; B60J 1/1823; B60J 7/13; B60J 7/106
USPC ................. 296/100.09, 164, 165, 167, 146.8
See application file for complete search history.

(56) References Cited

U.S. PATENT DOCUMENTS

| 3,690,719 | A | * | 9/1972 | Yount | ................. | B60P 3/34 |
| | | | | | | 296/100.07 |
| 5,016,935 | A | * | 5/1991 | Semple | ................. | B60P 3/32 |
| | | | | | | 292/DIG. 29 |
| 8,152,228 | B2 | * | 4/2012 | Bushbaum | ................. | B60J 7/106 |
| | | | | | | 296/164 |
| 2010/0314903 | A1 | * | 12/2010 | Voyer | ................. | B60J 5/104 |
| | | | | | | 296/146.8 |

* cited by examiner

*Primary Examiner* — Joseph D. Pape
(74) *Attorney, Agent, or Firm* — Quarles & Brady LLP

(57) ABSTRACT

A roof attachment for a passenger car includes at least one roof shell and at least two lateral-wall shells. The lateral-wall roof shells are arranged on opposite sides of the passenger car relative to a vertical longitudinal center plane of the roof and are pivotable between a storage position folded against an inner side of the roof shell and an unfolded usage position. The roof attachment has a cross section shaped like an upside-down U and can be attached onto interfaces of the passenger car via lower edges of the lateral-wall shells facing away from the roof shell. The roof shell and the lateral-wall shells can be brought into contact with a hard-top section and lateral pillars of the passenger car with their frontal edges when in the usage position. Rearward edges of the roof shell and the lateral-wall shells form a continuous edge of the vehicle rear.

10 Claims, 4 Drawing Sheets

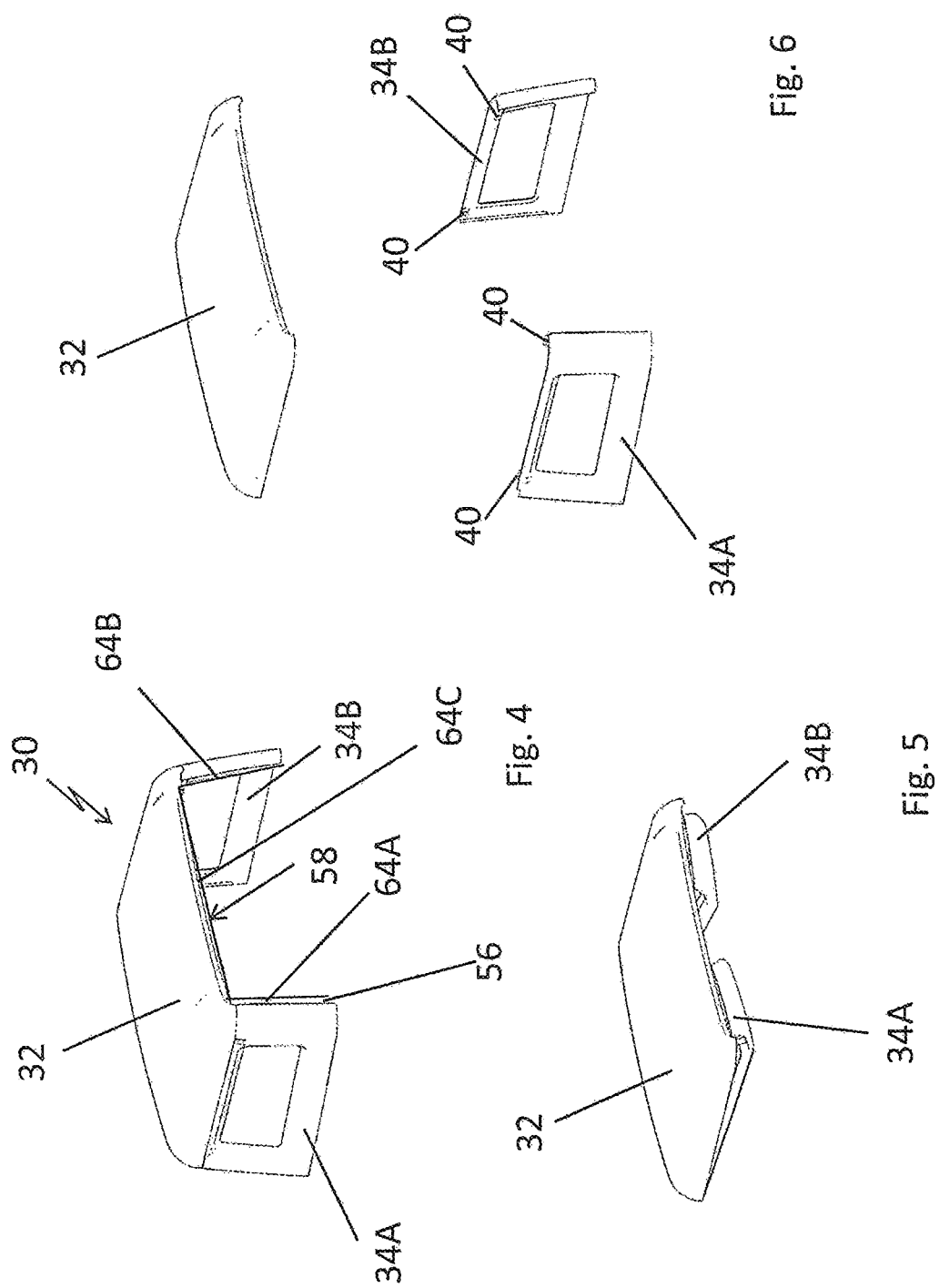

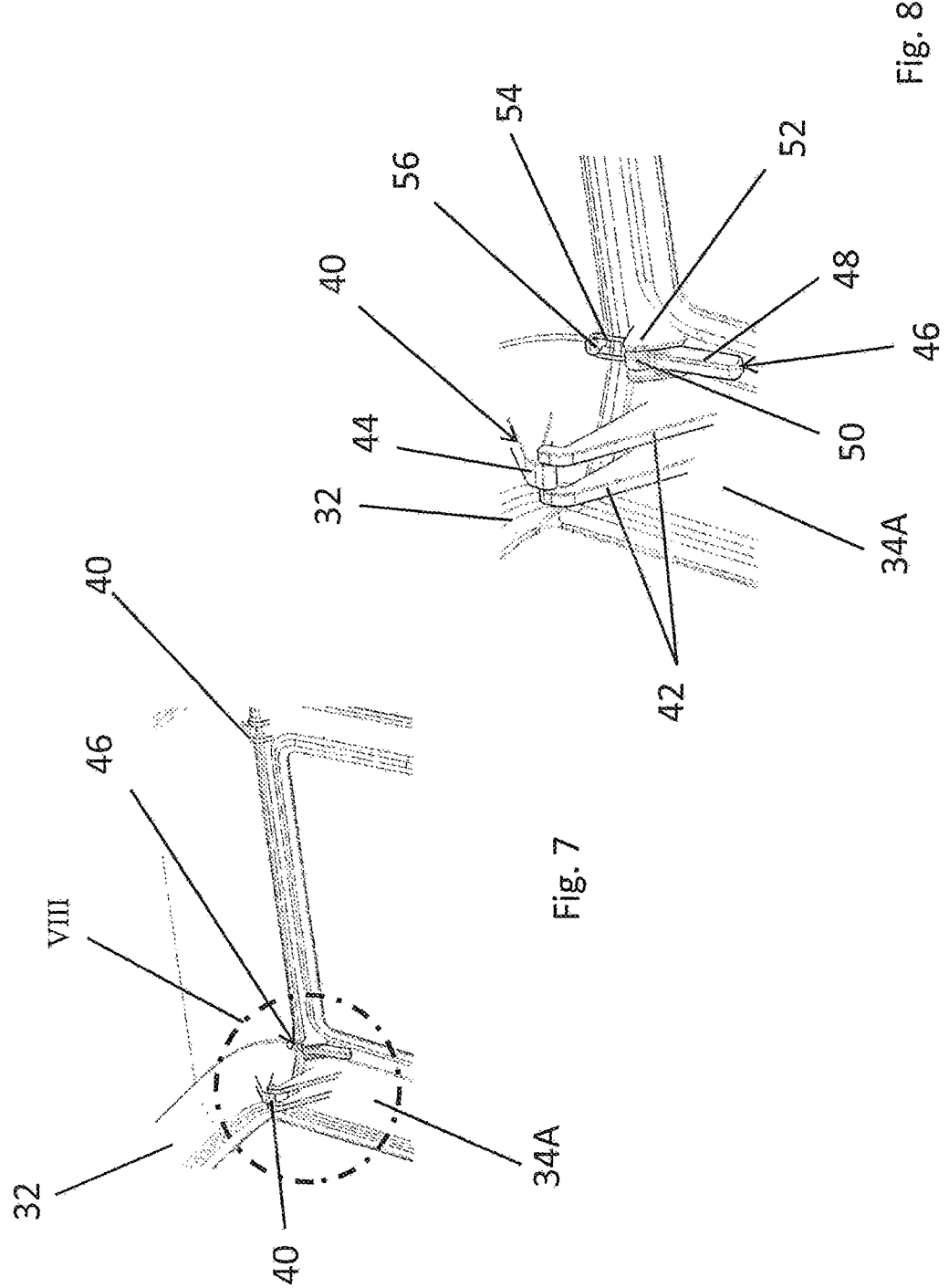

ROOF ATTACHMENT AND PASSENGER CAR COMPRISING A REMOVABLE ROOF ATTACHMENT

CROSS REFERENCE TO RELATED APPLICATION

Not Applicable.

STATEMENT REGARDING FEDERALLY SPONSORED RESEARCH OR DEVELOPMENT

Not applicable.

FIELD OF THE INVENTION

The invention relates to a roof attachment as well as to a passenger car comprising a removable roof attachment.

TECHNICAL BACKGROUND

Sport utility vehicles and pickup trucks are known from practice, which comprise a cargo bed arranged behind a vehicle interior for passengers. The interior space or rather the passenger cab has lateral walls, which are bordered by so-called B-pillars or C-pillars at the vehicle rear depending on the embodiment, a shoulder line connecting to each B-pillar or C-pillar toward the vehicle rear and leading to the rear side of the vehicle. The cargo bed is located between the shoulder lines. The cargo bed can be closed with a roof attachment, which comprises a roof area and lateral walls and whose roof area aligns flush with a roof section limiting the passenger cabin at the top. The lateral walls border the B-pillars or the C-pillars. The roof attachment is a bulky building component, which requires a lot of storage space when removed from the vehicle.

SUMMARY OF THE INVENTION

The object of the invention is to create a roof attachment for a passenger car as well as a passenger car having such a roof attachment, which can be easily removed from or mounted to the passenger car, respectively, and can be stored requiring little storage space.

In order to attain the object, a roof attachment for a passenger car is proposed, which comprises at least one roof shell and at least two lateral-wall shells arranged on both sides of the passenger car relative to a vertical longitudinal center plane of the roof, said lateral-wall shells being able to be pivoted between a storage position folded against an inner side of the roof shell and an unfolded usage position, in which the roof attachment has a cross section shaped like an upside-down U and can be attached onto interfaces of the passenger car via lower edges of the lateral-wall shells facing away from the roof shell. The roof shell and the lateral-wall shells can be brought into contact with a hard-top section and lateral pillars of the passenger car with their frontal edges when in the usage position. Rearward edges of the roof shell and the lateral-wall shells form a continuous edge of the vehicle rear. Hence, the roof attachment can be arranged flat, thus requiring only little storage space when being stored independently of the vehicle.

In a preferred embodiment of the roof attachment, the lateral-wall shells are each hinged to the roof shell via a hinge arrangement. The hinge arrangement can be formed by an individual joint which connects the corresponding lateral-wall shell to the roof shell via a pin or a bolt, which define a pivoting axis. Alternatively, the hinge arrangement can also comprise several pivoting axes, which enable storing the lateral-wall shells with as little space as possible.

In order to ensure that the roof attachment forms an inherently stable unit when in the usage position, in a preferred embodiment, the lateral-wall shells can be secured against a pivoting movement with respect to the roof shell by means of a securing element when in the unfolded usage position.

The securing elements each comprise, for example, at least one clamping lever, to which a clamping loop is hinged, which can be engaged with a clamping pin for clamping the corresponding lateral-wall shell at the roof shell. Preferably, the clamping lever is pivotably mounted at the corresponding lateral-wall shell, whereas the clamping pin is formed at the roof shell. Alternatively, it is also conceivable for the clamping lever to be pivotably mounted at the roof shell and for the clamping pin to be a component of the corresponding lateral-wall section.

In order to provide the corresponding passenger car with a tightly closed interior space at the vehicle rear when the roof attachment is attached, the roof shell and the lateral-wall shells each preferably carry a sealing section at their rearward edges, a rear window of the passenger car being able to be brought into contact with the sealing sections. The sealing sections of the roof shell and the lateral-wall shells preferably form a continuous, uninterrupted seal for the rear window.

The rear window is preferably integrated into a tailgate of the passenger car as a raisable window. The tailgate is formed, for example, in the make of a door having lateral door hinges or also as a tailgate having hinges at its lower edge, said tailgate being able to be pivoted downward from a closed position into an opening position via said hinges.

According to another aspect of the invention, a passenger car having a removable roof attachment is proposed, which comprises at least one roof shell and at least two lateral-wall shells arranged on both sides of the passenger car relative to a vertical longitudinal center plane of the roof, said lateral-wall shells each being able to be pivoted between a storage position folded against an inner side of the roof shell and an unfolded usage position, in which the roof attachment comprises a cross section shaped like an upside-down U and is attached onto interfaces of the passenger car via lower edges of the two lateral-wall sections facing away from the roof shell. The roof shell and the lateral-wall shells rest against a hard-top section and against lateral pillars of the passenger car with its frontal edges at the vehicle front when in the usage position. Rearward rear edges of the roof shell and of the lateral-wall shells form a continuous edge of the vehicle rear.

The roof attachment is preferably secured at each interfaces by means of a securing element. The securing element can comprise a connecting bolt and/or a screw. In the area of the interfaces, corresponding threads formed permanently on the vehicle are preferably formed on the vehicle construction.

In a specific embodiment, the passenger car comprises a rear window, which is integrated in a tailgate as a raisable window and can be displaced between a lowered opening position, in which the raisable window is received by the tailgate, and a raised closed position, in which the raisable window rests against sealing sections of the roof shell and the lateral-wall sections of the roof attachment.

BRIEF DESCRIPTION OF THE DRAWINGS

An exemplary embodiment of a passenger car comprising a removable roof attachment realized according to the invention is shown in the drawings in a schematically simplified manner and is further described in the following description.

FIG. 4 shows only the roof attachment in its unfolded usage position.

FIG. 5 shows the roof attachment in its storage position.

FIG. 6 shows an explosive view of the roof attachment.

FIG. 7 shows an inner view of the roof attachment.

FIG. 8 shows an enlarged view of an area VIII in FIG. 7.

DETAILED DESCRIPTION OF A PREFERRED EMBODIMENT

Figure 1:
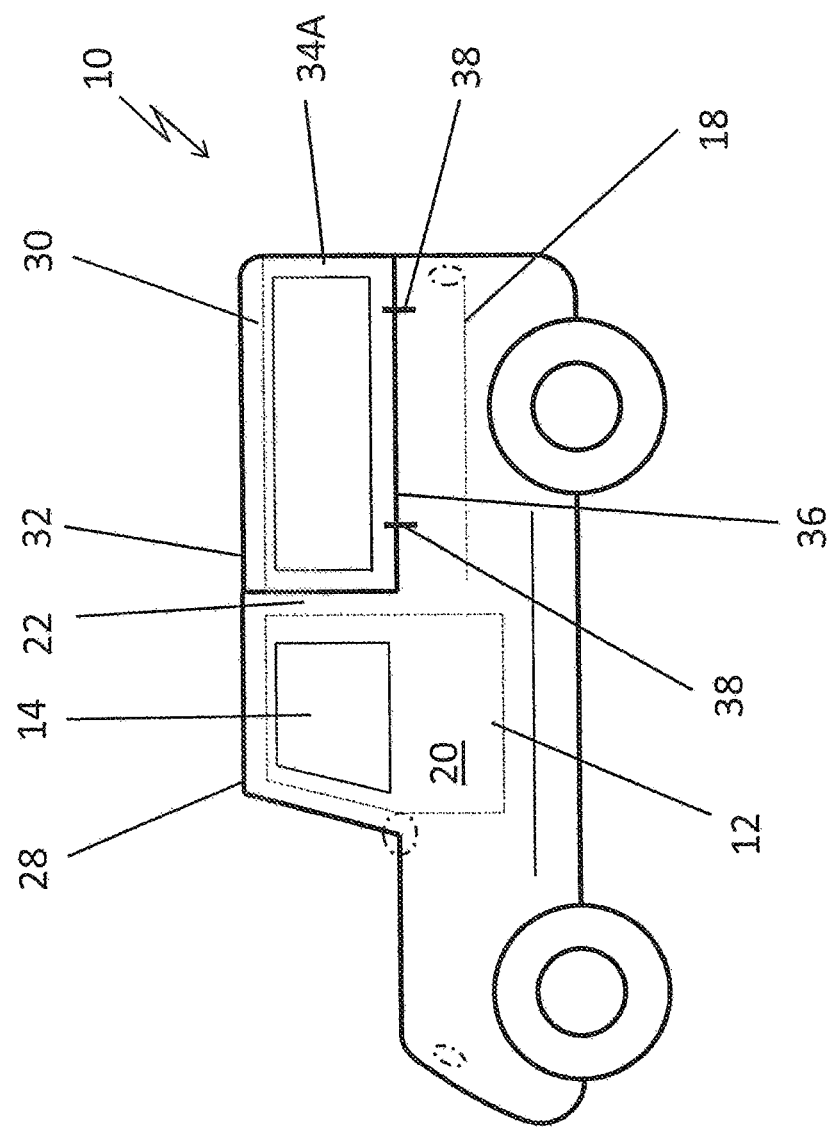
FIG. 1 shows a lateral view of a passenger car realized as a sports utility vehicle and comprising a roof attachment.

In the drawing, a passenger car 10 is shown, which is realized as a sports utility vehicle and comprises a vehicle construction 12 having a cabin 14 for passengers. The cabin 14 is realized having one row of seats, which means it contains a driver's seat and a passenger seat but no backbench. At the vehicle rear, a cargo space 16 comprising a cargo bed 18 abuts against the cabin 14. Furthermore, the passenger car 10 comprises side doors 20, which border the cabin 14 on both sides relative to the vertical longitudinal center plane of the vehicle and are each bordered by so-called B-pillars 22 of the vehicle construction 12 at the rear of the vehicle.

The cargo space 16 and its cargo bed 18, respectively, are covered by a roof attachment 30, which is shown on its own in FIGS. 4 to 8. The roof attachment comprises a roof shell 32 abutting against a hard-top section 28 of the cabin 14 at the vehicle rear, said roof shell 32 merging into each lateral-wall shell 34A and 34B, respectively, on each of the two sides of the passenger car relative to the vertical longitudinal center plane of the vehicle. The roof shell 32 and the lateral-wall shells 34A and 34B each have frontal edges, i.e. at the vehicle front, which abut against the B-pillars 22 and against the roof section 28 of the cabin 14 when in the mounting position, as seen in FIG. 1.

In the area of the cargo space 16, the roof attachment 30 is attached on shoulders 36 of the vehicle construction 12, said shoulders 36 forming interfaces, via lower edges of the lateral-wall shells 34A and 34B facing away from the roof shell 32 and is secured in the area of the cargo space 16 by means of securing screws 38, which engage with corresponding threads of the vehicle construction 12. The securing screws 38 therefore each form a securing element for the roof attachment 30.

As can be seen in particular in a synopsis of FIGS. 4 and 5, the roof attachment 30 has a usage position (FIG. 4), in which the lateral-wall shells 34A and 34B are unfolded and have a nearly 90° orientation regarding the plane of the roof shell 32. Moreover, the lateral-wall shells 34A and 34B can be brought into a storage position when the roof attachment 30 has been removed from the passenger car 10 (FIG. 5), in which position the lateral-wall shells 34A and 34B are folded against the inner side of the roof shell 32 facing away from the vehicle environment. The storage position can be secured via corresponding latching or securing means and enables storing the roof attachment with as little space as possible.

In order to be able to pivot the lateral-wall shells 34A and 34B between the usage position and the storage position, the two lateral-wall sections 34A and 34B are each hinged to the roof shell 32 via two simple hinges 40. The pivoting axes of the hinges 40 are each defined via a connecting bolt, which is mounted at a dual-shell bearing support 42 of the corresponding lateral-wall shell 34A and 34B, respectively, on the one hand and engages through a bearing protrusion 44 of the roof shell 32 on the other hand.

The usage position of the lateral-wall shells 34A and 34B is secured via a securing element 46 in each instance, said securing element 46 comprising a clamping lever 48, which is pivotably mounted at a dual-shell bearing pedestal 52 of the corresponding lateral-wall shells 34A and 34B, respectively, via a bearing protrusion 50 and is provided with a clamping loop 54, which is engaged with a bearing pin 56 in order to clamp the corresponding lateral-wall shell 34A and 34B, respectively, said bearing pin 56 being formed on the roof shell 32.

Figure 2:
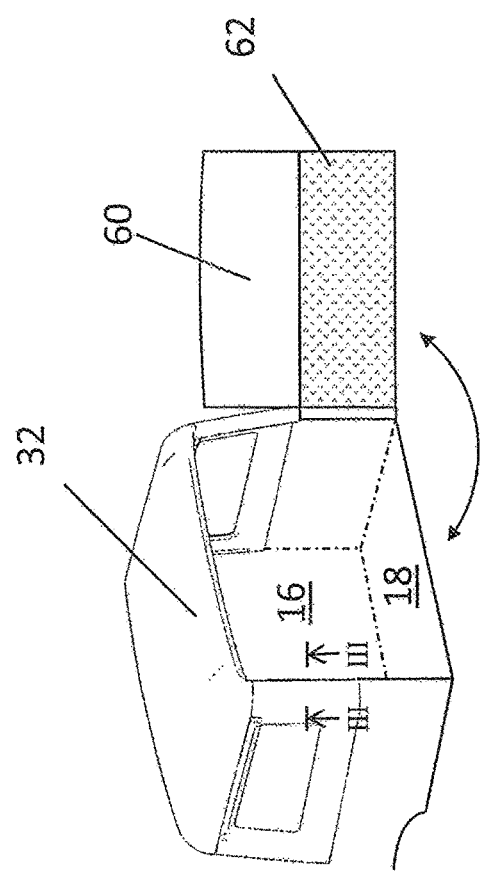
FIG. 2 shows a perspective rear view of the passenger car.

As can be seen in particular in the FIGS. 2 and 4, the roof attachment 30 forms a continuous edge 56 of the vehicle rear via the rearward edges of the roof shell 32 and the lateral-wall shells 34A and 34B. In the area of the edge 56 of the vehicle rear, a sealing arrangement 58 for a rear window 60 of the passenger car 60 is formed at the roof attachment 30.

Figure 3:
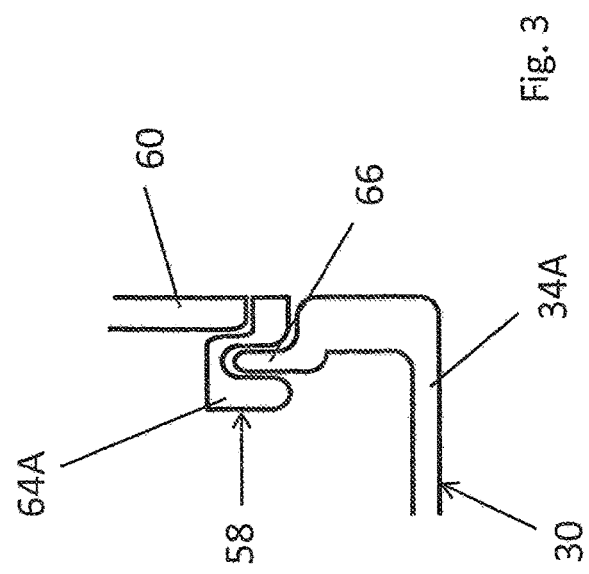
FIG. 3 shows a cut through the passenger car along the line III-III in FIG. 2.

The rear window 60 is a raisable window, which is integrated in a door-like tailgate 62 of the vehicle construction 12 and can be displaced between a lowered opening position, in which the raisable window is received by the tailgate 62, and a raised closed position, in which the raisable window rests against the sealing arrangement 58 of the roof attachment 30 when the tailgate 62 is in its closed position (cf. FIG. 3). The sealing arrangement 58 is formed by three sealing sections 64A, 64B and 64C, said sealing section 64A being formed at the rearward edge of the lateral-wall shell 34A, said sealing section 64B being formed at the rearward edge of the lateral-wall shell 34B and said sealing section 64C being formed at the rearward edge of the roof shell 32. The sealing sections 64A, 64B and 64C each form a sealing profile, which is attached onto a mounting link 66 of the corresponding shell 32, 34A or 34B, respectively. The sealing sections 64A, 64B and 64C together form a continuous and uninterrupted sealing arrangement for the rear window 60 when the roof attachment 30 is in its usage position.

LIST OF REFERENCES 10 passenger car
12 vehicle construction
14 cabin
16 cargo space
18 cargo bed
20 side door
22 B-pillar
28 roof section
30 roof attachment
32 roof shell
34A, B lateral-wall shell
36 shoulder line
38 securing screw
40 hinges
42 bearing support
44 bearing protrusion
46 securing element
48 clamping lever
50 bearing protrusion
52 bearing pedestal
54 clamping loop
56 edge of the vehicle rear 58 sealing arrangement
60 rear window
62 tailgate
64A, B, C sealing sections
66 mounting link

The invention claimed is:

1. A roof attachment for a roof of a passenger car, said roof attachment comprising:
   at least one roof shell; and
   two lateral-wall shells arranged on opposite sides of the passenger car relative to a vertical longitudinal center plane of the roof, said lateral-wall shells each being pivotable between a storage position folded against an inner side of the roof shell and an unfolded usage position, wherein the roof attachment defines a cross section in the shape of an upside-down U and can be attached onto interfaces of the passenger car via lower edges of the two lateral-wall shells facing away from the roof shell, said roof shell and said lateral-wall shells being able to be brought into contact with a hard-top section and with lateral pillars of the passenger car when in the usage position and rearward edges of the roof shell and of the lateral-wall shells forming a continuous edge of the vehicle rear, and a securing element securing the lateral-wall shells against the roof shell to prevent pivoting relative to the roof shell when in the unfolded usage position.

2. The roof attachment according to claim 1, wherein the lateral-wall shells are each hinged onto the roof shell via at least one hinge arrangement.

3. The roof attachment according to claim 1, wherein the securing elements each comprise a clamping lever having a clamping loop, which can be engaged with a bearing pin.

4. The roof attachment according to claim 1, wherein the roof shell and the lateral-wall shells each carry a sealing section at their rearward edges, a rear window of the passenger car being able to be brought into contact with said sealing sections.

5. A passenger car comprising a removable roof attachment, which said passenger car comprising:
   a roof;
   at least one roof shell; and
   two lateral-wall shells arranged on opposite sides of the passenger car relative to a vertical longitudinal center plane of the roof, said lateral-wall shells each being able to be pivoted between a storage position folded against an inner side of the roof shell and an unfolded usage position, wherein the roof attachment defines a cross section shaped like an upside-down U and is attached to interfaces of the passenger car via lower edges of the two lateral-wall shells facing away from the roof shell, the frontal edges of said roof shell and said lateral-wall shells abutting against a hard-top section and against lateral pillars of the passenger car when in the usage position and rearward edges of the roof shell and of the lateral-wall shells forming a continuous edge of the vehicle rear, and a securing element securing the lateral-wall shells against the roof shell to prevent pivoting relative to the roof shell when in the unfolded usage position.

6. The passenger car according to claim 5, wherein the roof attachment is secured to each of the interfaces by a securing element.

7. The passenger car according to claim 6, wherein the securing element includes a bolt and/or a screw.

8. The passenger car according to claim 5, wherein the lateral-wall shells are each secured against a pivoting movement with respect to the roof shell by a securing element when in the unfolded usage position.

9. The passenger car according to claim 8, wherein the securing elements each includes a clamping lever having a clamping loop, which is engaged with a bearing pin.

10. The passenger car according to claim 5, wherein the roof shell and the lateral-wall sections comprise sealing sections, and including a rear window integrated into a tailgate as a raisable window, the raisable window being displaceable between a lowered opening position, in which the raisable window is received by the tailgate, and a raised closed position, in which the raisable window rests against sealing sections of the roof shell and the lateral-wall sections of the roof attachment at the vehicle rear.

* * * * *